(12) United States Patent
Saigo

(10) Patent No.: US 9,373,161 B2
(45) Date of Patent: Jun. 21, 2016

(54) IMAGE PROCESSING DEVICE, PROJECTOR, AND IMAGE PROCESSING METHOD

(71) Applicant: SEIKO EPSON CORPORATION, Tokyo (JP)

(72) Inventor: Manabu Saigo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 41 days.

(21) Appl. No.: 14/188,126

(22) Filed: Feb. 24, 2014

(65) Prior Publication Data

US 2014/0247287 A1   Sep. 4, 2014

(30) Foreign Application Priority Data

Mar. 1, 2013   (JP) ................................. 2013-040867

(51) Int. Cl.
*G06T 5/00* (2006.01)
*G06T 3/00* (2006.01)
*H04N 9/31* (2006.01)
*H04N 9/28* (2006.01)
*H04N 5/74* (2006.01)
*G06T 7/00* (2006.01)

(52) U.S. Cl.
CPC . *G06T 5/006* (2013.01); *G06T 3/00* (2013.01); *G06T 7/0018* (2013.01); *H04N 5/74* (2013.01); *H04N 5/7408* (2013.01); *H04N 9/28* (2013.01); *H04N 9/31* (2013.01); *H04N 9/3102* (2013.01); *H04N 9/3147* (2013.01); *H04N 9/3182* (2013.01); *H04N 9/3185* (2013.01)

(58) Field of Classification Search
CPC . H04N 9/3185; H04N 9/3182; H04N 9/3147; G06T 7/0018; G03B 21/10
USPC ............... 345/214, 647; 353/69; 348/E9.025, 348/E5.137, E5.138; 382/275, 308
See application file for complete search history.

(56) References Cited

U.S. PATENT DOCUMENTS

| 2002/0164083 | A1* | 11/2002 | Song et al. ..................... 382/275 |
| 2003/0222892 | A1* | 12/2003 | Diamond et al. ............. 345/647 |
| 2004/0257366 | A1  | 12/2004 | Moriwaki et al. |
| 2008/0062164 | A1* | 3/2008  | Bassi et al. ..................... 345/214 |
| 2014/0218695 | A1* | 8/2014  | Roberts et al. .................. 353/69 |

FOREIGN PATENT DOCUMENTS

JP   B2-3914891   5/2007

* cited by examiner

*Primary Examiner* — Jin-Cheng Wang
(74) *Attorney, Agent, or Firm* — Oliff PLC

(57) ABSTRACT

An image processing device adapted to correct a keystone distortion of an image projected on a region where a first plane and a second plane intersect with each other at a predetermined angle includes a transformation section adapted to calculate a first coordinate to be referred to in a first coordinate transformation for correcting the keystone distortion and a second coordinate to be referred to in a second coordinate transformation for correcting the keystone distortion, a combination section adapted to generate a composite coordinate obtained by combining the first coordinate and the second coordinate calculated by the transformation section, and a correction section adapted to perform a coordinate transformation for correcting the keystone distortion using the composite coordinate generated by the combination section.

9 Claims, 7 Drawing Sheets

IMAGE PROCESSING DEVICE, PROJECTOR, AND IMAGE PROCESSING METHOD

The entire disclosure of Japanese Patent Application No. 2013-040867, filed Mar. 1, 2013, is expressly incorporated by reference herein.

BACKGROUND

1. Technical Field

The present invention relates to an image processing device, a projector, and an image processing method.

2. Related Art

There exists a projector for projecting a projection image on a nonplanar projection surface (e.g., a curved surface, a concave surface, and a convex surface). For example, in a technology described in Japanese Patent No. 3,914,891 (Document 1), a memory holds a predetermined approximation formula in order to correct the distortion of the projection image due to the shape of the projection surface of a screen, and when a numerical value is input to a parameter of the approximation formula in an input device, the shape of the deformed figure of the projection image is calculated based on the approximation formula and the numerical value, a deformation process of the projection image is performed using the deformed figure obtained by the calculation, and the projection image on which the deformation process has been performed is projected on the screen.

However, in the technology described in Document 1, the parameter of the approximation formula used for correcting the distortion of the projection image is set by the user, and there is a disadvantage that discontinuity in image occurs in the projection image in the case in which the parameter fails to be set accurately. As described above, there has been a problem that the convenience of the user in projecting the projection image on the region where a first plane and a second plane intersect with each other is insufficient.

SUMMARY

An advantage of some aspects of the invention is to provide an image processing device, a projector, and an image processing method each capable of keeping the continuity in image in projecting the projection image on the region where the first plane and the second plane intersect with each other to thereby enhance the convenience of the user.

(1) An aspect of the invention is directed to an image processing device adapted to correct a keystone distortion of an image projected on a region where a first plane and a second plane intersect with each other at a predetermined angle, the image processing device including a transformation section adapted to calculate a first coordinate to be referred to in a first coordinate transformation for correcting the keystone distortion and a second coordinate to be referred to in a second coordinate transformation for correcting the keystone distortion, a combination section adapted to generate a composite coordinate obtained by combining the first coordinate and the second coordinate calculated by the transformation section, and a correction section adapted to perform a coordinate transformation for correcting the keystone distortion using the composite coordinate generated by the combination section.

According to this configuration of the image processing device, since the coordinates (the first coordinate and the second coordinate) referred to in the two coordinate transformations (the first coordinate transformation and the second coordinate transformation) for correcting the keystone distortion are combined with each other, and then the keystone distortion is corrected by the coordinate transformation using the coordinate thus combined in the case of projecting the image on the region where the first plane and the second plane intersect with each other, it becomes possible to perform the correction taking advantages of the characteristics of each of the coordinate transformations, and it is possible to keep the continuity of the projection image to enhance the convenience of the user.

(2) Another aspect of the invention is directed to the image processing device according to the aspect of the invention described above, wherein the first coordinate transformation is a transformation in which discontinuity can occur in the image on an intersection line between the first plane and the second plane, and the second coordinate transformation is a transformation in which no discontinuity can occur in the image on the intersection line.

According to this configuration, since the image processing device uses the coordinate to be referred to in the second coordinate transformation in which no discontinuity can occur in the image on the intersection line between the first plane and the second plane, it is possible to keep the continuity of the projection image to enhance the convenience of the user.

(3) Still another aspect of the invention is directed to the image processing device according to the aspect of the invention described above, wherein the first coordinate transformation is a perspective transformation, and the second coordinate transformation is a transformation using a linear expression.

According to this configuration of the image processing device, since it becomes possible to perform the correction taking advantages of the characteristics of each of the perspective transformation in which a distortion (deflection) hardly occurs in the corrected image and the transformation using a linear expression in which no discontinuity occurs in the image, it is possible to keep the continuity of the projection image in the region where the first plane and the second plane intersect with each other to enhance the convenience of the user.

(4) Yet another aspect of the invention is directed to the image processing device according to the aspect of the invention described above, wherein the combination section combines the first coordinate and the second coordinate with each other while weighting the first coordinate and the second coordinate.

According to this configuration, since the image processing device can combine the first coordinate and the second coordinate at an appropriate allocation, it is possible to keep the continuity of the image in the region where the first plane and the second plane intersect with each other to enhance the convenience of the user.

(5) Still yet another aspect of the invention is directed to the image processing device according to the aspect of the invention described above, wherein the combination section combines the first coordinate and the second coordinate with each other so that the shorter a distance from the intersection line between the first plane and the second plane is, the greater the weight of the second coordinate becomes.

According to this configuration of the image processing device, since the discontinuity in the image is suppressed on the intersection line, and it becomes possible to project the image in the state in which the distortion (deflection) of the image is suppressed in the position distant from the intersection line, it is possible to keep the continuity of the image in the region where the first plane and the second plane intersect with each other to enhance the convenience of the user.

(6) Further another aspect of the invention is directed to the image processing device according to the aspect of the invention described above, wherein the combination section combines the first coordinate and the second coordinate with each other while weighting the first coordinate and the second coordinate differently between a horizontal direction and a vertical direction.

According to this configuration, since the image processing device can perform the appropriate correction in each of the horizontal direction and the vertical direction, it is possible to keep the continuity of the image in the region where the first plane and the second plane intersect with each other to enhance the convenience of the user.

(7) Still further another aspect of the invention is directed to a projector equipped with an image processing device adapted to correct a keystone distortion of an image projected on a region where a first plane and a second plane intersect with each other at a predetermined angle, the projector including a transformation section adapted to calculate a first coordinate to be referred to in a first coordinate transformation for correcting the keystone distortion and a second coordinate to be referred to in a second coordinate transformation for correcting the keystone distortion, a combination section adapted to generate a composite coordinate obtained by combining the first coordinate and the second coordinate calculated by the transformation section, a correction section adapted to perform a coordinate transformation for correcting the keystone distortion using the composite coordinate generated by the combination section, and a projection section adapted to project the image on which the correction section has performed the coordinate transformation.

According to this configuration of the projector, since the coordinates (the first coordinate and the second coordinate) referred to in the two coordinate transformations (the first coordinate transformation and the second coordinate transformation) for correcting the keystone distortion are combined with each other, and then the keystone distortion is corrected by the coordinate transformation using the coordinate thus combined in the case of projecting the image on the region where the first plane and the second plane intersect with each other, it becomes possible to perform the correction taking advantages of the characteristics of each of the coordinate transformations, and it is possible to keep the continuity of the projection image to enhance the convenience of the user.

(8) Yet further another aspect of the invention is directed to an image processing method adapted to correct a keystone distortion of an image projected on a region where a first plane and a second plane intersect with each other at a predetermined angle, the image processing method including calculating a first coordinate to be referred to in a first coordinate transformation for correcting the keystone distortion and a second coordinate to be referred to in a second coordinate transformation for correcting the keystone distortion, generating a composite coordinate obtained by combining the first coordinate and the second coordinate calculated in the calculating, and performing a coordinate transformation for correcting the keystone distortion using the composite coordinate generated in the generating.

According to this configuration of the image processing method, since the coordinates (the first coordinate and the second coordinate) referred to in the two coordinate transformations (the first coordinate transformation and the second coordinate transformation) for correcting the keystone distortion are combined with each other, and then the keystone distortion is corrected by the coordinate transformation using the coordinate thus combined in the case of projecting the image on the region where the first plane and the second plane intersect with each other, it becomes possible to perform the correction taking advantages of the characteristics of each of the coordinate transformations, and it is possible to keep the continuity of the projection image to enhance the convenience of the user.

According to the aspects of the invention, in the case of projecting the projection image in the region where the first plane and the second plane intersect with each other, it is possible to keep the continuity of the image to enhance the convenience of the user.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Embodiment

Hereinafter, an embodiment of the invention will be explained in detail with reference to the accompanying drawings.

Figure 1:
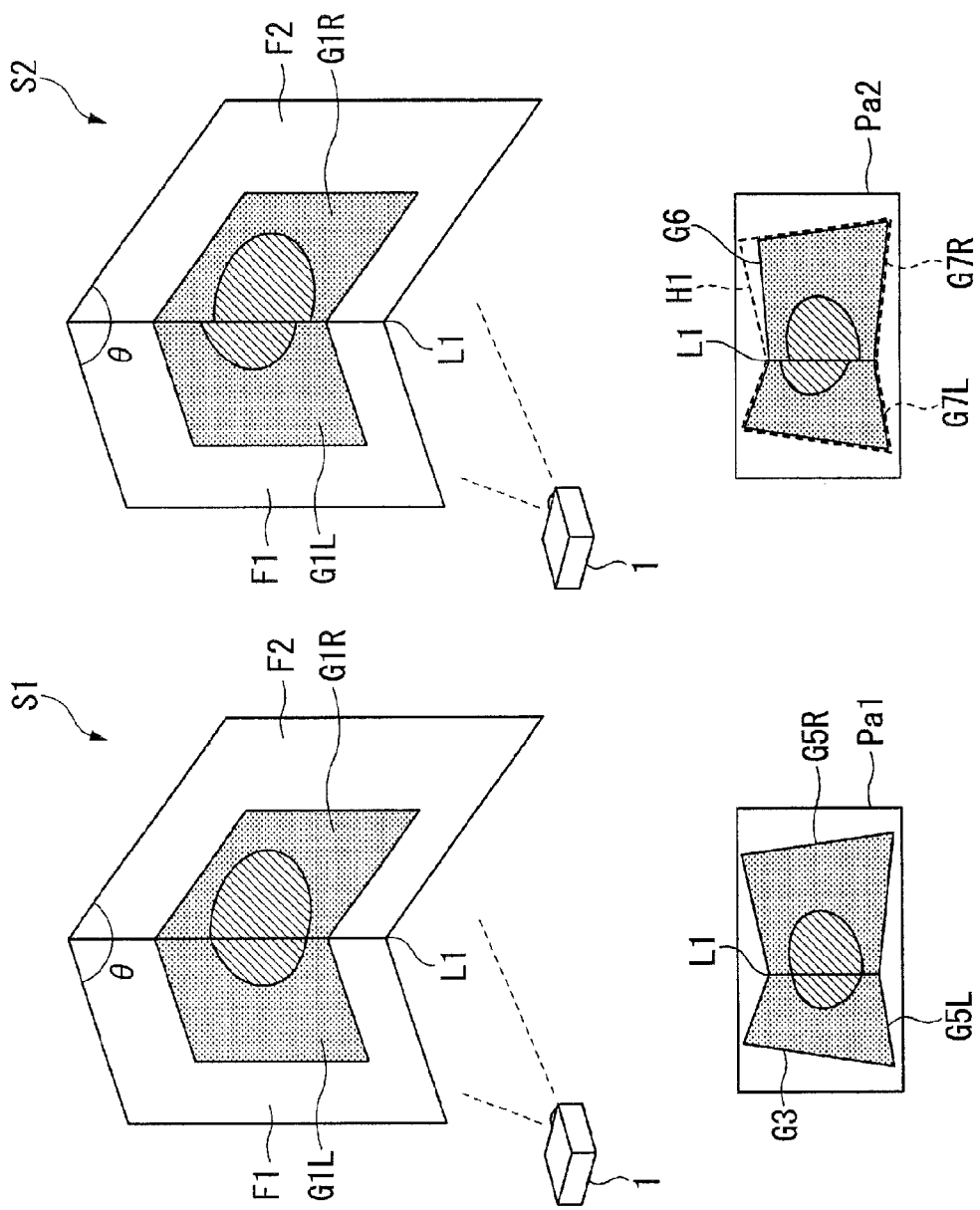
FIG. 1 is a schematic diagram showing use conditions of a projector equipped with an image processing device according to an embodiment of the invention.

FIG. 1 is a schematic diagram showing use conditions S1, S2 of a projector 1 equipped with an image processing device according to the embodiment of the invention.

The projector 1 is provided with a liquid crystal panel as an image forming section, and projects the image, which is formed on the liquid crystal panel, on an external projection surface. In the present embodiment, the projector 1 projects the image on a region where a first plane F1 and a second plane F2 intersect with each other at an angle θ. When projecting the image on such a region, since the image is divided into two parts by an intersection line L1 between the first plane F1 and the second plane F2, and the keystone distortion occurs in each of the parts, the projector 1 is required to correct the keystone distortion in each of the first plane F1 and the second plane F2. The projector 1 according to the present embodiment allows the user to designate the positions of vertexes of each of the images thus divided, and then deforms each of the images with the positions of the vertexes thus designated to thereby correct the keystone distortion.

In the use conditions S1, S2 of the projector 1, the image projected from the projector 1 is divided into right and left parts with the intersection line L1, wherein the image projected on the first plane F1 on the left side is defined as a projection image G1L, and the image projected on the second plane F2 on the right side is defined as a projection image G1R. In this case, in order to make the projector 1 correct the keystone distortion, the user designates four vertexes of the projection image G1L and four vertexes of the projection image G1R. It should be noted that the upper right vertex in the projection image G1L, which is a vertex on the intersection line L1, and the upper left vertex in the projection image G1R are the same, and the lower right vertex in the projection image G1L and the lower left vertex in the projection image G1R are the same. Therefore, it is sufficient for the user to designate six vertexes. In the use conditions S1, S2, there is shown an example of the case in which the projector 1 corrects the keystone distortion using the perspective transformation based on the positions of the six vertexes designated by the user.

The use condition S1 is an example of the case in which the user accurately designates the positions of the vertexes in the projection images G1L, G1R. The projection image G1L projected on the first plane F1 and the projection image G1R projected on the second plane F2 form a projection image continuing on the intersection line L1 without discontinuity. In this case, the image Pa1 on the liquid crystal panel is an image including images G5L, G5R. Since the user has accurately designated the positions of the vertexes, the images G5L, G5R form an image continuing on the intersection line L1 without discontinuity.

In contrast, the use condition S2 is an example of the case in which the user fails to accurately designate the positions of the vertexes in the projection images G1L, G1R. As the cause of failing to accurately designate the vertexes, there can be cited an optical distortion of the projector 1, a distortion of the projection surfaces (the first plane F1 and the second plane F2), an error due to a visual observation, and so on. The projection image G1L projected on the first plane F1 and the projection image G1R projected on the second plane F2 become discontinuous on the intersection line L1. In this case, the image Pa2 on the liquid crystal panel is an image including images G7L, G7R. Since the user has failed to accurately designate the positions of the vertexes, the images G7L, G7R become discontinuous on the intersection line L1. Here, in comparison between the image G3 of the image Pa1 on the liquid crystal panel and the image G6 of the image Pa2 on the liquid crystal panel, the image G6 has a correction shape shifted from a correction shape H1 corresponding to the image G3.

Figure 2:
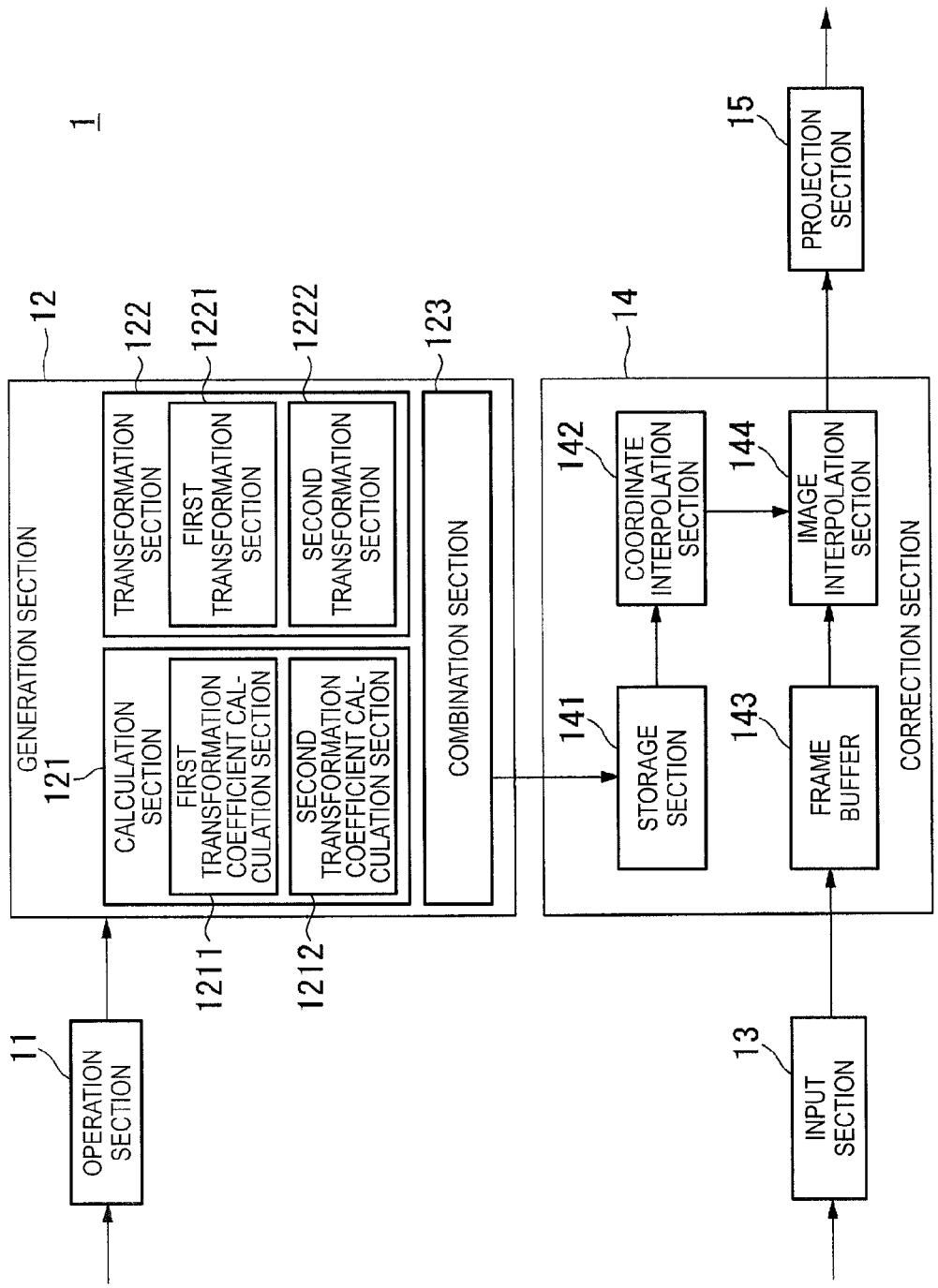
FIG. 2 is a schematic block diagram showing an example of a configuration of the projector according to the embodiment.

FIG. 2 is a schematic block diagram showing an example of a configuration of the projector 1 according to the present embodiment.

The projector 1 is configured to include an operation section 11, a generation section 12, an input section 13, a correction section 14, and a projection section 15. Further, the generation section 12 is configured to include a calculation section 121, a transformation section 122, and a combination section 123. Further, the calculation section 121 is configured to include a first transformation coefficient calculation section 1211 and a second transformation coefficient calculation section 1212. Further, the transformation section 122 is configured to include a first transformation section 1221 and a second transformation section 1222. Further, the correction section 14 is configured to include a storage section 141, a coordinate interpolation section 142, a frame buffer 143, and an image interpolation section 144. Although the projector 1 is provided with other functions of a typical projector, such functions will be omitted from the drawings and the explanation.

The operation section 11 receives a variety of operations from the user, and outputs an operation signal, which corresponds to any of the variety of operations, to the generation section 12. For example, when receiving the input of the positional coordinates of the vertexes of the image from the user, the operation section 11 outputs the positional coordinates to the generation section 12.

The generation section 12 generates a coordinate table for designating a distortion correction shape based on the positional coordinates of the vertexes of the image input from the operation section 11. The generation section 12 outputs the coordinate table thus generated to the correction section 14. Specifically, in the case in which the image input from the input section 13 to the correction section 14 is defined as the input image, and the corrected image output from the correction section 14 to the projection section 15, namely the image formed on the liquid crystal panel is defined as the output image, the generation section 12 obtains a reference coordinate (x, y), which is represented by the positional coordinate of the input image, and is referred to by the pixel coordinate (i, j) representing the positional coordinate of the pixel of the output image, at predetermined pixel intervals to thereby generate the coordinate table.

Figure 3:
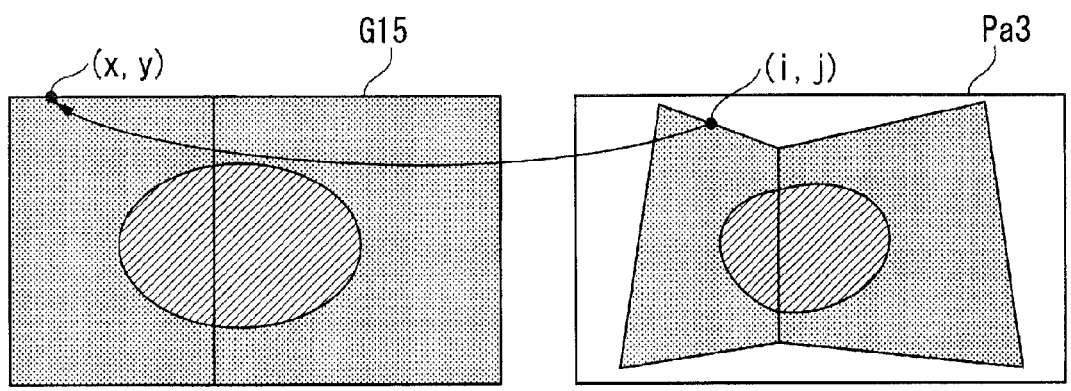
FIG. 3 is an explanatory diagram showing a relationship between the pixel coordinate and a reference coordinate according to the embodiment.

FIG. 3 is an explanatory diagram showing a relationship between the pixel coordinate and the reference coordinate according to the present embodiment.

The generation section 12 obtains the reference coordinate (x, y), which is represented by the positional coordinate of the input image G15, and is referred to by the pixel coordinate (i, j) representing the positional coordinate of the pixel of the output image Pa3, at predetermined pixel intervals to thereby generate the coordinate table. For example, in the case in which the predetermined pixel intervals are each an interval of 16 pixels, the generation section 12 generates the coordinate table using the pixel coordinates (i, j)=(0, 0), (0, 16), ... , (16, 0), (16, 16), ... as the reference coordinates of the input image to be referred to.

Going back to FIG. 2, the input section 13 receives the input of the image signal from the outside (e.g., a personal computer) of the projector 1. The input section 13 outputs the image signal thus input to the correction section 14.

The correction section 14 looks up the coordinate table input from the generation section 12, and then performs the distortion correction on the image signal input from the input section 13.

The projection section 15 is provided with a discharge lamp as the light source, the liquid crystal panel as an image forming device, a projection lens as the projection optical system, and so on, and forms a corrected image input from the correction section 14 on the liquid crystal panel, and projects the corrected image on the projection surface as the projection image. It should be noted that the configuration of the projection section 15 is not limited to the configuration described above, but can variously be modified. For example, it is also possible to use a solid-state light source such as a light emitting diode or a semiconductor laser as the light source, or to use a digital mirror device and so on as the image forming device.

Figure 4:
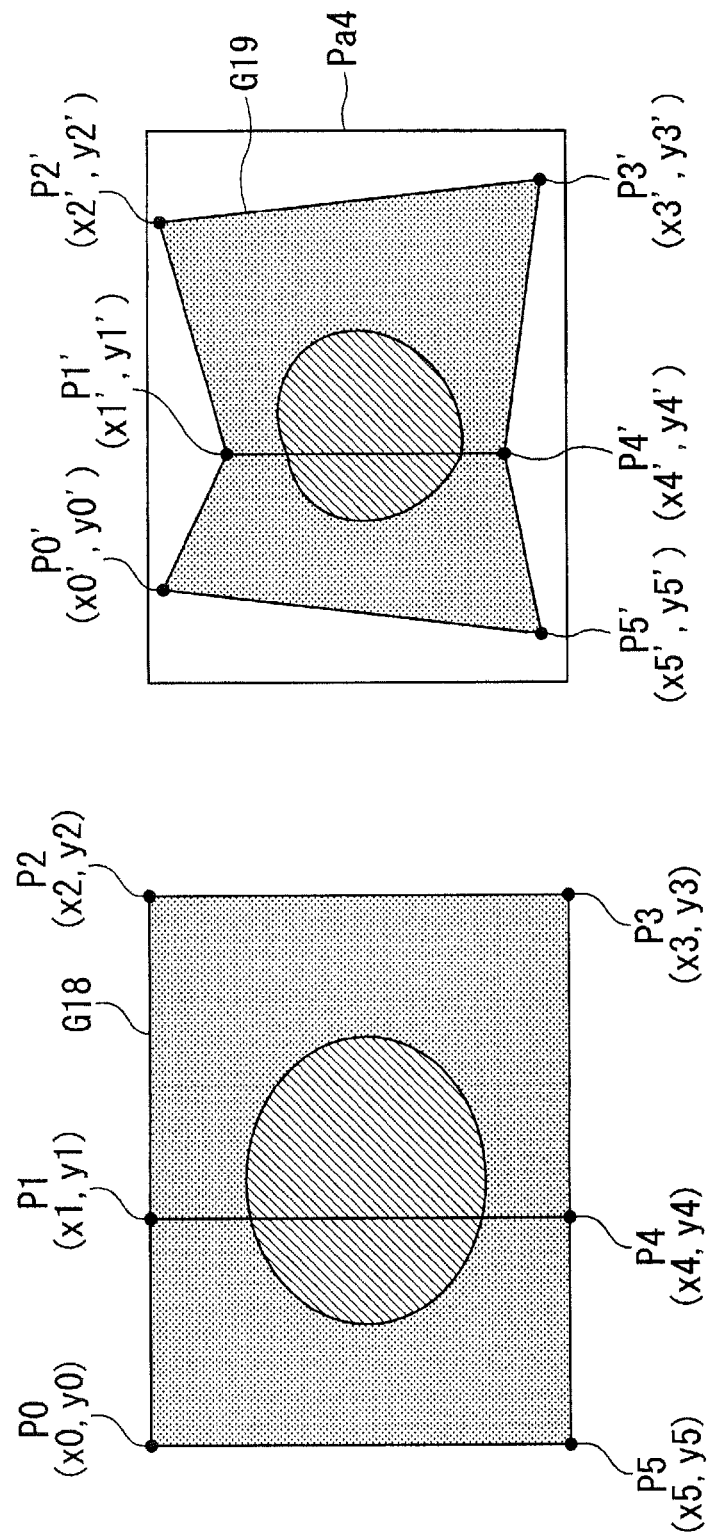
FIG. 4 is an explanatory diagram showing an example of positional coordinates of vertexes in an input image and an output image according to the embodiment.

FIG. 4 is an explanatory diagram showing an example of the positional coordinates of the vertexes P0, P1, P2, P3, P4, P5, P0', P1', P2', P3', P4', and P5' in the input image G18 and the output image G19 according to the present embodiment.

In the input image G18, the positional coordinates of the vertexes P0, P1, P2, P3, P4, and P5 are defined as (x0, y0), (x1, y1), (x2, y2), (x3, y3), (x4, y4), and (x5, y5), respectively. Further, in the output image G19, the positional coordinates of the vertexes P0', P1', P2', P3', P4', and P5' are defined as (x0', y0'), (x1', y1'), (x2', y2'), (x3', y3'), (x4', y4'), and (x5', y5'), respectively.

Here, the intersection line where the first plane and the second plane intersect with each other in the input image G18 is assumed to be parallel to a vertical direction (a Y-axis direction) of the image (x1=x4).

Going back to FIG. 2, the first transformation coefficient calculation section 1211 calculates transformation coefficients of the first transformation (first coordinate transformation) from a coordinate (hereinafter referred to as an output coordinate) in the output image to a coordinate (hereinafter referred to as an input coordinate) in the input image. Here, the first transformation is, for example, the perspective transformation.

In the case of using the perspective transformation as the first transformation, assuming that the first transformation coefficients with respect to the transformation of the image (to be projected on the first plane) surrounded by the vertexes P0', P1', P4', and P5' in FIG. 4 are AperL, BperL, CperL, DperL, EperL, FperL, GperL, and HperL, and the first transformation coefficients with respect to the transformation of the image (to be projected on the second plane) surrounded by the vertexes P1', P2', P3', and P4' in FIG. 4 are AperR, BperR, CperR, DperR, EperR, FperR, GperR, and HperR, the transformation from the output coordinate (x', y') to the input coordinate (x, y) is defined by the following formulas.

$$x = \frac{A_{perL}x' + B_{perL}y' + C_{perL}}{G_{perL}x' + H_{perL}y' + 1}$$

$$y = \frac{D_{perL}x' + E_{perL}y' + F_{perL}}{G_{perL}x' + H_{perL}y' + 1}$$

Formula (1)

$$x = \frac{A_{perR}x' + B_{perR}y' + C_{perR}}{G_{perR}x' + H_{perR}y' + 1}$$

$$y = \frac{D_{perR}x' + E_{perR}y' + F_{perR}}{G_{perR}x' + H_{perR}y' + 1}$$

Formula (2)

The first transformation coefficient calculation section 1211 substitutes the positional coordinates (x0, y0), (x1, y1), (x4, y4), (x5, y5), (x0', y0'), (x1', y1'), (x4', y4'), and (x5', y5') of the respective vertexes to Formula (1), and substitutes the positional coordinates (x1, y1), (x2, y2), (x3, y3), (x4, y4), (x1', y1'), (x2', y2'), (x3', y3'), and (x4', y4') of the respective vertexes to Formula (2). The first transformation coefficient calculation section 1211 calculates simultaneous equations with eight unknowns with respect to each of Formulas (1) and (2), to which the positional coordinates of the vertexes are substituted, to thereby calculate the first transformation coefficients AperL, BperL, CperL, DperL, EperL, FperL, GperL, and HperL, and the first transformation coefficients AperR, BperR, CperR, DperR, EperR, FperR, GperR, and HperR.

The second transformation coefficient calculation section 1212 calculates the transformation coefficients of the second transformation (the second coordinate transformation) from the input coordinate to the output coordinate. Here, the second transformation is the transformation with a linear expression, and is the transformation using a linear expression such as a bilinear transformation or an affine transformation.

In the case of using the bilinear transformation as the second transformation, assuming that the second transformation coefficients with respect to the transformation of the image (to be projected on the first plane) surrounded by the vertexes P0, P1, P4, and P5 in FIG. 4 are AbilL, BbilL, CbilL, DbilL, EbilL, FbilL, GbilL, and HbilL, and the second transformation coefficients with respect to the transformation of the image (to be projected on the second plane) surrounded by the vertexes P1, P2, P3, and P4 in FIG. 4 are AbilR, BbilR, CbilR, DbilR, EbilR, FbilR, GbilR, and HbilR, the transformation from the input coordinate (x, y) to the output coordinate (x', y') is defined by the following formulas.

$$x' = A_{bilL}xy + B_{bilL}x + C_{bilL}y + D_{bilL}$$

$$y' = E_{bilL}xy + F_{bilL}x + G_{bilL}y + H_{bilL}$$

Formula (3)

$$x' = A_{bilR}xy + B_{bilR}x + C_{bilR}y + D_{bilR}$$

$$y' = E_{bilR}xy + F_{bilR}x + G_{bilR}y + H_{bilR}$$

Formula (4)

The second transformation coefficient calculation section 1212 substitutes the positional coordinates (x0, y0), (x1, y1), (x4, y4), (x5, y5), (x0', y0'), (x1', y1'), (x4', y4'), and (x5', y5') of the respective vertexes to Formula (3), and substitutes the positional coordinates (x1, y1), (x2, y2), (x3, y3), (x4, y4), (x1', y1'), (x2', y2'), (x3', y3'), and (x4', y4') of the respective vertexes to Formula (4). The second transformation coefficient calculation section 1212 calculates simultaneous equations with four unknowns with respect to each of Formulas (3) and (4), to which the positional coordinates of the vertexes are substituted, to thereby calculate the second transformation coefficients AbilL, BbilL, CbilL, DbilL, EbilL, FbilL, GbilL, and HbilL, and the second transformation coefficients AbilR, BbilR, CbilR, DbilR, EbilR, FbilR, GbilR, and HbilR.

The transformation section 122 calculates the input coordinate (x, y) of the input image referred to by the output coordinate (x', y') of the output image from the first transformation coefficients and the second transformation coefficients calculated by the calculation section 121.

The first transformation section 1221 calculates the coordinate (xper, yper) using Formulas (1) and (2).

The second transformation section 1222 calculates the coordinate (xbil, ybil) using Formulas (5) and (6) obtained by modifying Formulas (3) and (4). Specifically, the second transformation section 1222 calculates a combination, which has the shortest distance between the solution obtained and the center of the image out of the four solutions obtained using Formula (5) or Formula (6), as the coordinate (xbil, ybil).

$$x = \frac{-b \pm \sqrt{b^2 - 4ac}}{2a}$$

Formula (5)

$$a = A_{bilL}F_{bilL} - B_{bilL}E_{bilL}$$
$$b = E_{bilL}x' - A_{bilL}y' - D_{bilL}E_{bilL} -$$
$$\qquad B_{bilL}G_{bilL} + C_{bilL}F_{bilL} + A_{bilL}H_{bilL}$$
$$c = G_{bilL}x' - C_{bilL}y' - D_{bilL}G_{bilL} + C_{bilL}H_{bilL}$$

$$y = \frac{-e \pm \sqrt{e^2 - 4df}}{2d}$$

$$d = A_{bilL}G_{bilL} - C_{bilL}E_{bilL}$$
$$e = E_{bilL}x' - A_{bilL}y' - D_{bilL}E_{bilL} +$$
$$\qquad B_{bilL}G_{bilL} - C_{bilL}F_{bilL} + A_{bilL}H_{bilL}$$
$$f = F_{bilL}x' - B_{bilL}y' - D_{bilL}F_{bilL} + B_{bilL}H_{bilL}$$

-continued $$x = \frac{-b \pm \sqrt{b^2 - 4ac}}{2a}$$ Formula (6)

$a = A_{bilR}F_{bilR} - B_{bilR}E_{bilR}$
$b = E_{bilR}x' - A_{bilR}y' - D_{bilR}E_{bilR} -$
$\qquad B_{bilR}G_{bilR} + C_{bilR}F_{bilR} + A_{bilR}H_{bilR}$
$c = G_{bilR}x' - C_{bilR}y' - D_{bilR}G_{bilR} + C_{bilR}H_{bilR}$ $$y = \frac{-e \pm \sqrt{e^2 - 4df}}{2d}$$

$d = A_{bilR}G_{bilR} - C_{bilR}E_{bilR}$
$e = E_{bilR}x' - A_{bilR}y' - D_{bilR}E_{bilR} +$
$\qquad B_{bilR}G_{bilR} - C_{bilR}F_{bilR} + A_{bilR}H_{bilR}$
$f = F_{bilR}x' - B_{bilR}y' - D_{bilR}F_{bilR} + B_{bilR}H_{bilR}$ Here, Formula (5) is a second transformation formula with respect to the image (to be projected on the first plane) surrounded by the vertexes P0, P1, P4, and P5 in FIG. 4, and Formula (6) is a second transformation formula with respect to the image (to be projected on the second plane) surrounded by the vertexes P1, P2, P3, and P4 in FIG. 4.

The combination section 123 combines the coordinate (xper, yper) and the coordinate (xbil, ybil) calculated by the transformation section 122 with each other. Specifically, the combination is performed so that the proportion of the coordinate (xbil, ybil) is increased (for example, 100%) as the distance from the intersection line where the first plane and the second plane intersect with each other decreases, and the proportion of the coordinate (xper, yper) is increased as the distance therefrom increases. Assuming that the coordinate obtained by the combination is, for example, (xcom, ycom), the combination section 123 performs the combination of the coordinate using Formula (7) below.

$A=(x_1-x_{per})/x_1$ $Wx=A/(A+(1-A)\cdot\alpha)$ $Wy=A/(A+(1-A)\cdot\beta)$ $x_{com}=Wx\cdot x_{per}+(1-Wx)\cdot x_{bil}$ $y_{com}=Wy\cdot y_{per}+(1-Wy)\cdot y_{bil}$ Formula (7)

Here, Wx, Wy represent the weight in the horizontal direction (the X-axis direction) and the weight in the vertical direction (the Y-axis direction), respectively, α and β are parameters for adjusting the weights Wx, Wy for combining the first transformation and the second transformation with each other. It should be noted that the parameters for adjusting the weights Wx, Wy are preferably values different from each other, but can also be the same value.

The generation section 12 generates the coordinate table setting the reference coordinate, which is referred to by the pixel coordinate, to (x', y')=(i, j). The generation section 12 stores the coordinate table thus generated in the storage section 141.

It should be noted that although it is assumed in the present embodiment that the intersection line is parallel to the Y-axis direction, an application to the case in which the intersection line is parallel to the X-axis direction is also possible. Further, in the case in which the intersection line is not parallel to both of the X-axis direction and the Y-axis direction (e.g., the case in which the intersection line has a tilt), it is possible for the combination section 123 to perform the combination of the coordinates by expressing the intersection line between the first plane and the second plane as Formula (8), and using Formula (9).

$x=ay+b$ Formula (8)

$A=(a\cdot y_{per}+b-x_{per})/(a\cdot y_{per}+b)$ $Wx=A/(A+(1-A)*\alpha)$ $Wy=A/(A+(1-A)*\beta)$ $x_{com}=Wx\cdot x_{per}+(1-Wx)\cdot x_{bil}$ $y_{com}=Wy\cdot y_{per}+(1-Wy)\cdot y_{bil}$ Formula (9)

The storage section 141 stores the coordinate table generated by the generation section 12.

The coordinate interpolation section 142 reads out the coordinate table from the storage section 141, looks up the coordinate table thus read out, and then obtains the reference coordinate of the pixel coordinate absent from the coordinate table using linear interpolation. The coordinate interpolation section 142 outputs the coordinate table, on which the interpolation has been performed, to the image interpolation section 144.

The frame buffer 143 temporarily stores the image signal input from the input section 13 as much as, for example, one frame.

When the coordinate table is input from the coordinate interpolation section 142, the image interpolation section 144 looks up the coordinate table, and interpolates the pixel values of the reference coordinates with, for example, a pixel interpolation filter with respect to the image signal read out from the frame buffer 143 to thereby generate the corrected image. The image interpolation section 144 outputs the corrected image thus generated to the projection section 15.

Figure 5:
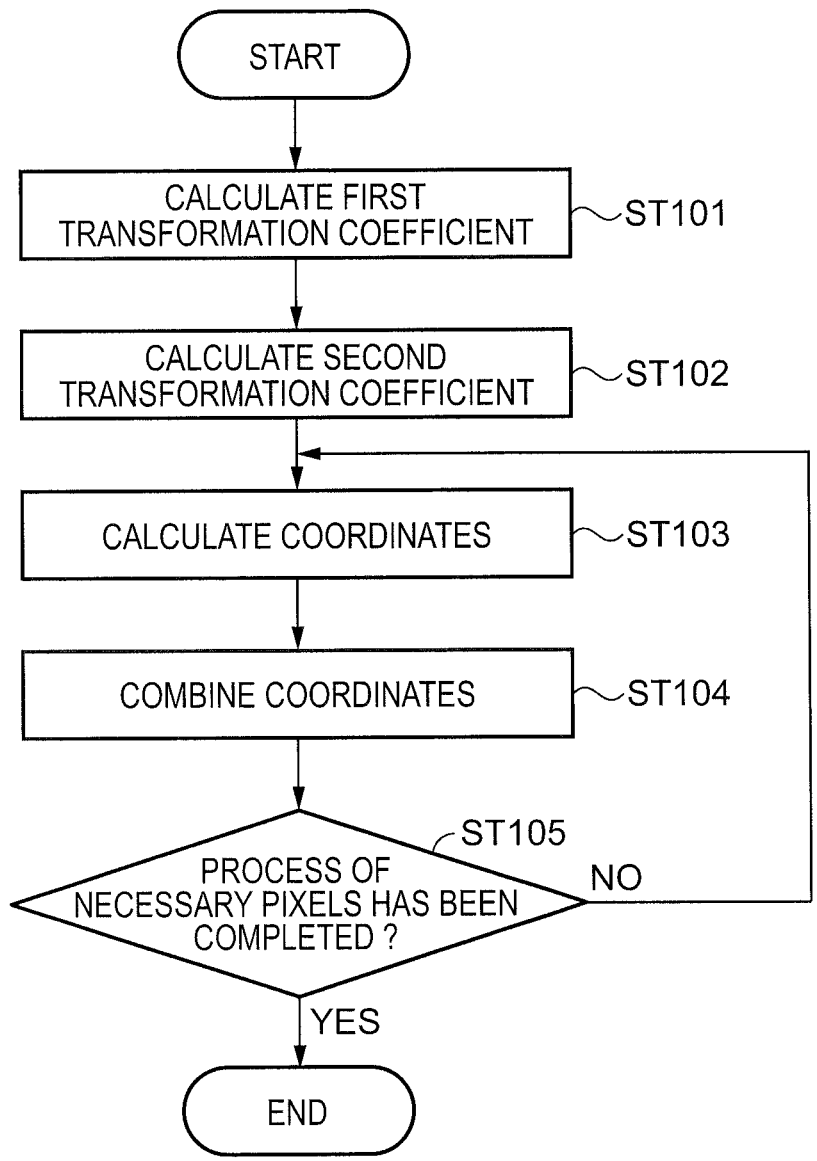
FIG. 5 is a flowchart showing an example of an action of a generation section according to the embodiment.

FIG. 5 is a flowchart showing an example of an action of the generation section 12 according to the present embodiment.

In the step ST101, the first transformation coefficient calculation section 1211 calculates the transformation coefficients of the first transformation from the output coordinate to the input coordinate.

In the step ST102, the second transformation coefficient calculation section 1212 calculates the transformation coefficients of the second transformation from the input coordinate to the output coordinate.

In the step ST103, the transformation section 122 calculates the input coordinate (x, y) of the input image referred to by the output coordinate (x', y') of the output image, namely the coordinate (xper, yper) and the coordinate (xbil, ybil), from the first transformation coefficients and the second transformation coefficients calculated by the calculation section 121.

In the step ST104, the combination section 123 combines the coordinate (xper, yper) and the coordinate (xbil, ybil) calculated by the transformation section 122 with each other.

In the step ST105, there is determined whether or not the process (the calculation and the combination of the coordinates) has been completed with respect to all of the pixels necessary for the coordinate table. In the case in which the process of all of the pixels has not been completed, the process returns to the step ST103. On the other hand, in the case in which the process of all of the pixels has been completed, the generation section 12 stores the coordinate table thus generated in the storage section 141.

Figure 6:
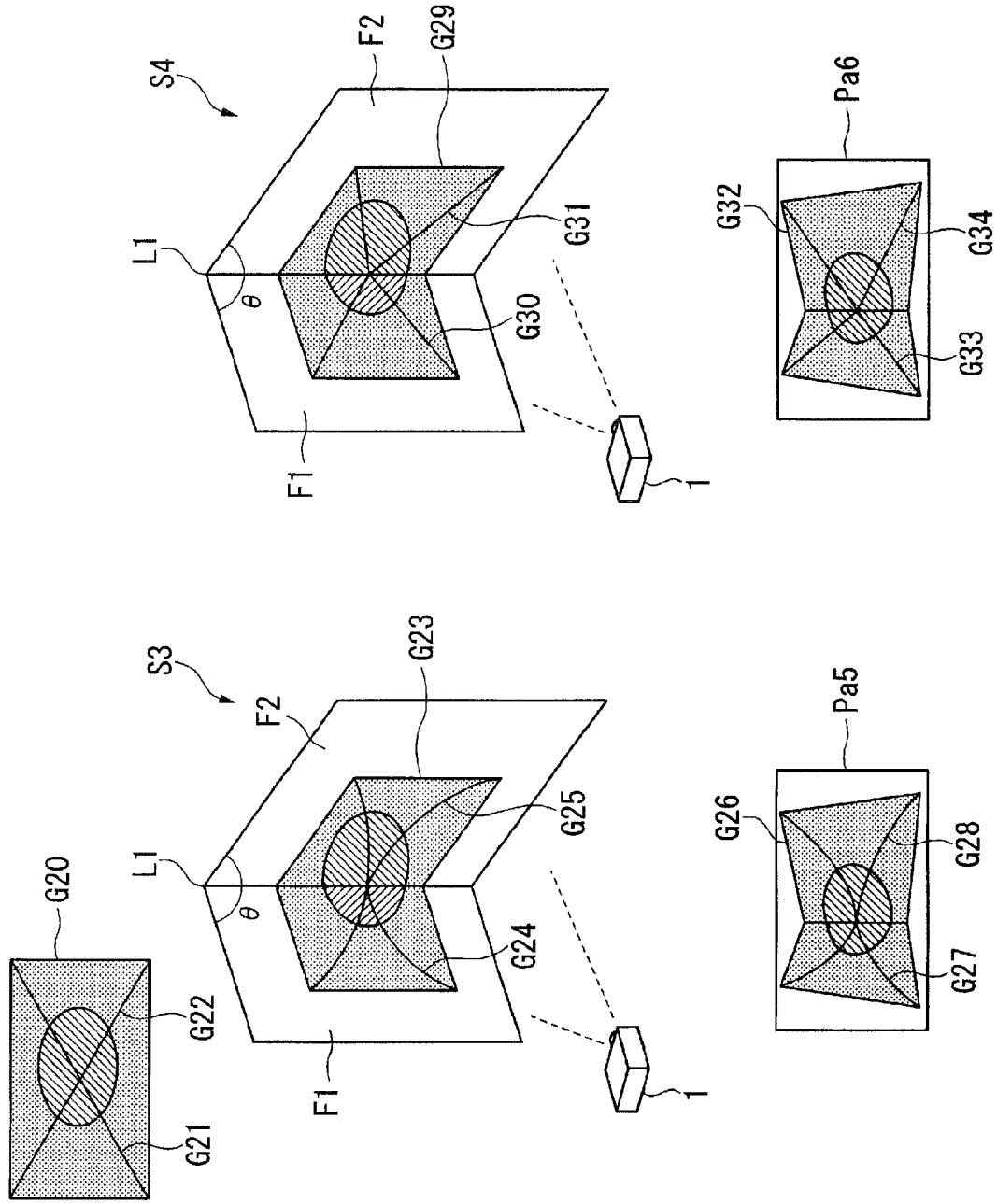
FIG. 6 is an explanatory diagram showing a use condition of the projector equipped with the image processing device according to the embodiment.

FIG. 6 is an explanatory diagram showing use conditions S3, S4 of the projector 1 equipped with the image processing device according to the present embodiment.

The input image G20 projected by the projector 1 is an image including, for example, straight lines G21, G22, and a circle.

In the use condition S3 of the projector 1, the projector 1 projects the projection image G23 on the region where the first plane F1 and the second plane F2 intersect with each other at the angle θ. The use condition S3 shows the projection image G23 projected when performing the distortion correction on, for example, the input image G20 using only the second transformation. In the projection image G23 projected on the first plane F1 and the second plane F2, although the discontinuity of the image does not occur in the projection image, the straight lines G21, G22 of the input image G20 become the curved lines G24, G25 obtained by providing distortion (deflection) to the straight lines G21, G22, respectively. On this occasion, also in the image Pa5 on the liquid crystal panel to be projected on the projection surface by the projector 1, the straight lines G21, G22 of the input image G20 become the curved lines G27, G28 obtained by providing distortion (deflection) to the straight lines G21, G22, respectively.

On the other hand, in the use condition S4 of the projector 1, the projector 1 projects the projection image G29 on the region where the first plane F1 and the second plane F2 intersect with each other at the angle θ. The use condition S4 shows the projection image G29 projected when performing the distortion correction on, for example, the input image G20 using only the first transformation. By the user correctly setting the positional coordinates of the vertexes in the projection image G29, in the projection image G29 projected on the first plane F1 and the second plane F2, the discontinuity of the image does not occur in the projection image, and the straight lines G21, G22 of the input image G20 become the lines G30, G31 with no distortion (deflection) provided to the straight lines G21, G22. On this occasion, also in the image Pa6 on the liquid crystal panel to be projected on the projection surface by the projector 1, the straight lines G21, G22 of the input image G20 become the lines G33, G34 with no distortion (deflection) provided to the straight lines G21, G22. However, it is difficult for the user to correctly input the positional coordinates of the vertexes, and in the case in which the user fails to correctly set the positional coordinates of the vertexes, the discontinuity of the image occurs in the projection image as in the projection image shown in the use condition S2 of FIG. 1.

Figure 7:
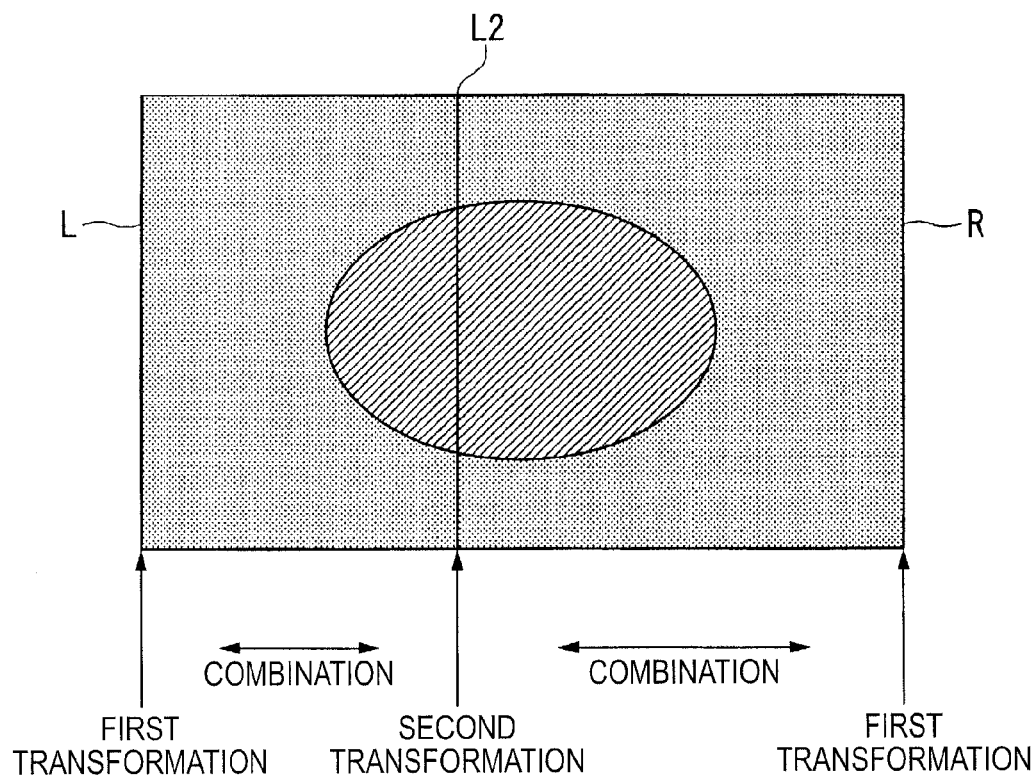
FIG. 7 is an explanatory diagram for explaining an example of an action of a combination section according to the embodiment when combining coordinates of first transformation and second transformation with each other.

FIG. 7 is an explanatory diagram for explaining an example of an action of the combination section 123 according to the present embodiment when combining the coordinates of the first transformation and the second transformation with each other.

The combination section 123 generates the projection image to be projected on the region where the first plane and the second plane intersect with each other at the angle θ by combining the transformation coordinate using the first transformation and the transformation coordinate using the second transformation with each other with the weight Wx and the weight Wy, respectively.

In the coordinate on the intersection line L2 between the first plane and the second plane, the combination section 123 combines the coordinates while weighting the transformation coordinate by the second transformation so that, for example, the influence of the second transformation becomes 100%. Further, on the left side L and the right side R of the correction shape, the combination section 123 combines the coordinates while weighting the transformation coordinate by the first transformation so that, for example, the influence of the first transformation becomes 100%. In between each of the left side L and the right side R, and the intersection line L2, the combination section 123 combines the coordinates while varying the weight so that the closer to the intersection line L2 the position moves from each of the left side L and the right side R, the greater the weight of the second transformation becomes.

It should be noted that although in the embodiment described above, it is assumed that the user inputs the positional coordinates of the vertexes, it is also possible to automatically set the positional coordinates of the vertexes or the intersection line using a three-dimensional object. Further, although in the present embodiment it is explained that the projector 1 projects the image on the region where the first plane and the second plane intersect with each other, the invention is not limited to this configuration, but it is also possible to arrange that the projector 1 projects the image on the region where the first plane and the second plane convexly intersect with each other. Thus, even in the case of projecting the image on the region where two planes convexly intersect with each other, the same advantage as in the case of projecting the image on the region where two planes intersect with each other in a concave manner.

As described above, according to the present embodiment, the image processing device is for correcting the keystone distortion of the image projected on the region where the first plane and the second plane intersect with each other at a predetermined angle, and is provided with the transformation section 122 adapted to calculate the first coordinate to be referred to in the first coordinate transformation for correcting the keystone distortion and the second coordinate to be referred to in the second coordinate transformation for correcting the keystone distortion, the combination section 123 adapted to generate a composite coordinate obtained by combining the first coordinate and the second coordinate calculated by the transformation section 122, and the correction section 14 adapted to perform the coordinate transformation for correcting the keystone distortion using the composite coordinate generated by the combination section 123.

Thus, since the coordinates (the first coordinate and the second coordinate) referred to in the two coordinate transformations (the first coordinate transformation and the second coordinate transformation) for correcting the keystone distortion are combined with each other, and then the keystone distortion is corrected by the coordinate transformation using the coordinate thus combined in the case of projecting the image on the region where the first plane and the second plane intersect with each other, it becomes possible to perform the correction taking advantages of the characteristics of each of the coordinate transformations, and it is possible to keep the continuity of the projection image to enhance the convenience of the user.

It should be noted that it can also be arranged that a part or the whole of the image processing device and the projector in the embodiment described above is realized by a computer. In this case, it is also possible to realize the control function by storing a program for realizing the control function in a computer-readable storage medium, and then making the computer system retrieve and then execute the program stored in the storage medium.

It should be noted that the "computer system" mentioned here corresponds to a computer system incorporated in the image processing device or the projector, and should include an OS and hardware such as peripheral devices. Further, the "computer-readable storage medium" denotes a portable storage medium such as a flexible disk, a magneto-optical disk, a ROM, and a CD-ROM, and a storage device such as a hard disk incorporated in the computer system. Further, the "computer-readable storage medium" can include those dynamically holding a program for a short period of time such as a communication line in the case of transmitting the program via a communication line such as a telephone line or a network such as the Internet, and those holding a program for a certain period of time such as a volatile memory in a computer system to be a server or a client in that occasion. Further, the program described above can be one for partially realizing the functions described above, or one realizing the functions described above in combination with a program having already been stored in the computer system.

Further, it is also possible to realize a part or the whole of the image processing device and the projector in the embodiment described above as an integrated circuit such as an LSI (Large Scale Integration). Each of the functional blocks of the image processing device and the projector can individually be realized as a processor, or can partially or totally be integrated as a processor. Further, the method of the circuit integration is not limited to LSI, but the circuit can be realized by a dedicated circuit or a general-purpose processor. Further, in the case in which a technology of the circuit integration replacing the LSI appears due to the advance in semiconductor technology, it is also possible to use an integrated circuit derived from such a technology.

Although an embodiment of the invention is hereinabove explained in detail with reference to the accompanying drawings, the specific configuration is not limited to the configuration described above, but a variety of design changes can be made within the scope or the spirit of the invention.

What is claimed is:

1. An image processing device adapted to correct a keystone distortion of an image projected on a region where a first plane and a second plane intersect with each other at a predetermined angle, the image processing device comprising:
   a transformation section adapted to calculate a first coordinate with a first designated vertex to be referred to in a first coordinate transformation for correcting the keystone distortion and a second coordinate with a second designated vertex to be referred to in a second coordinate transformation for correcting the keystone distortion;
   a combination section adapted to generate a composite coordinate obtained by combining the first coordinate and the second coordinate calculated by the transformation section; and
   a correction section adapted to perform a coordinate transformation for correcting the keystone distortion using the composite coordinate generated by the combination section, wherein
   the first coordinate transformation is a transformation in which discontinuity can occur in the image on an intersection line between the first plane and the second plane,
   the second coordinate transformation is a transformation in which no discontinuity occurs in the image on the intersection line,
   the combination section combines the first coordinate and the second coordinate with each other while weighting the first coordinate and the second coordinate, and
   the combination section combines the first coordinate and the second coordinate with each other so that the weight of the second coordinate increases as a distance from the intersection line between the first plane and the second plane decreases.

2. The image processing device according to claim 1, wherein
   the first coordinate transformation is a perspective transformation, and
   the second coordinate transformation is a transformation using a linear expression.

3. The image processing device according to claim 1, wherein
   the combination section combines the first coordinate and the second coordinate with each other while weighting the first coordinate and the second coordinate differently between a horizontal direction and a vertical direction.

4. A projector equipped with an image processing device adapted to correct a keystone distortion of an image projected on a region where a first plane and a second plane intersect with each other at a predetermined angle, the projector comprising:
   a transformation section adapted to calculate a first coordinate with a first designated vertex to be referred to in a first coordinate transformation for correcting the keystone distortion and a second coordinate with a second designated vertex to be referred to in a second coordinate transformation for correcting the keystone distortion;
   a combination section adapted to generate a composite coordinate obtained by combining the first coordinate and the second coordinate calculated by the transformation section;
   a correction section adapted to perform a coordinate transformation for correcting the keystone distortion using the composite coordinate generated by the combination section; and
   a projection section adapted to project the image on which the correction section has performed the coordinate transformation, wherein
   the first coordinate transformation is a transformation in which discontinuity can occur in the image on an intersection line between the first plane and the second plane,
   the second coordinate transformation is a transformation in which no discontinuity occurs in the image on the intersection line,
   the combination section combines the first coordinate and the second coordinate with each other while weighting the first coordinate and the second coordinate, and
   the combination section combines the first coordinate and the second coordinate with each other so that the weight of the second coordinate increases as a distance from the intersection line between the first plane and the second plane decreases.

5. The projector according to claim 4, wherein
   the first coordinate transformation is a perspective transformation, and
   the second coordinate transformation is a transformation using a linear expression.

6. The projector according to claim 4, wherein
   the combination section combines the first coordinate and the second coordinate with each other while weighting the first coordinate and the second coordinate differently between a horizontal direction and a vertical direction.

7. An image processing method adapted to correct a keystone distortion of an image projected on a region where a first plane and a second plane intersect with each other at a predetermined angle, the image processing method comprising:
   calculating a first coordinate with a first designated vertex to be referred to in a first coordinate transformation for correcting the keystone distortion and a second coordinate with a second designated vertex to be referred to in a second coordinate transformation for correcting the keystone distortion;
   generating a composite coordinate obtained by combining the first coordinate and the second coordinate calculated in the calculating; and
   performing a coordinate transformation for correcting the keystone distortion using the composite coordinate generated in the generating, wherein the first coordinate transformation is a transformation in which discontinuity can occur in the image on an intersection line between the first plane and the second plane, the second coordinate transformation is a transformation in which no discontinuity occurs in the image on the intersection line, in the generating, the first coordinate and the second coordinate are combined with each other while weighting the first coordinate and the second coordinate, and in the generating, the first coordinate and the second coordinate are combined with each other so that the weight of the second coordinate increases as a distance from the intersection line between the first plane and the second plane decreases.

8. The image processing method according to claim 7, wherein the first coordinate transformation is a perspective transformation, and the second coordinate transformation is a transformation using a linear expression.

9. The image processing method according to claim 7, wherein in the generating, the first coordinate and the second coordinate are combined with each other while weighting the first coordinate and the second coordinate differently between a horizontal direction and a vertical direction.

* * * * *